Figure 1:
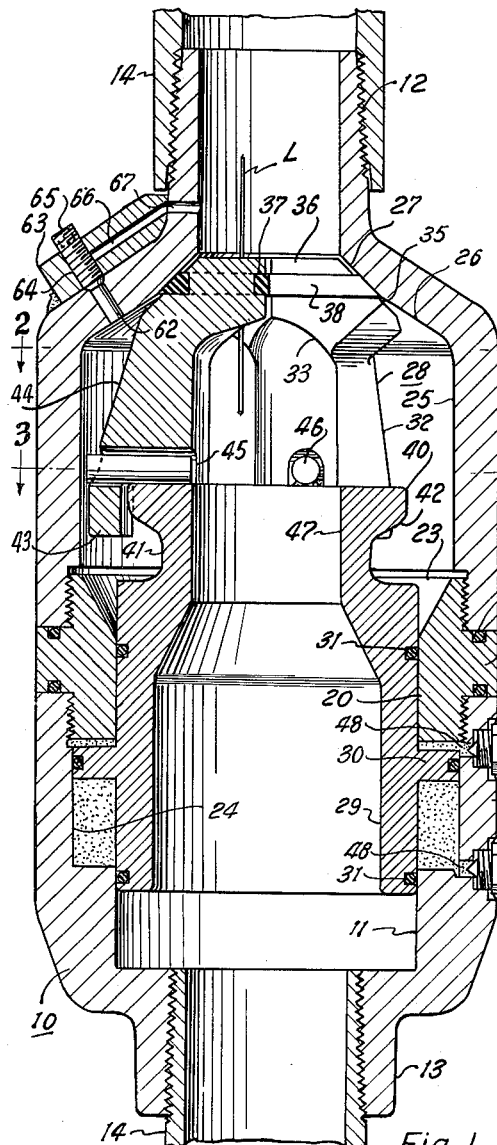

April 9, 1963     I. A. MILLER     3,084,898

FLUID ACTUATED VALVE

Original Filed April 22, 1955     2 Sheets-Sheet 1

INVENTOR
Ira A. Miller

BY Ashley & Ashley

ATTORNEYS

April 9, 1963 I. A. MILLER 3,084,898
FLUID ACTUATED VALVE
Original Filed April 22, 1955 2 Sheets-Sheet 2
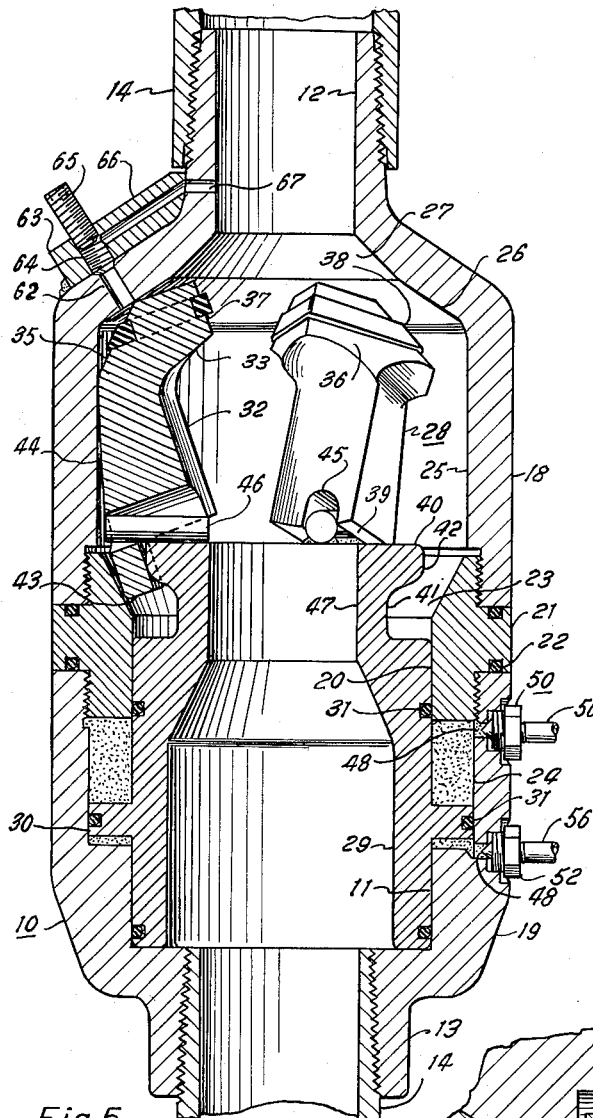
Fig. 5
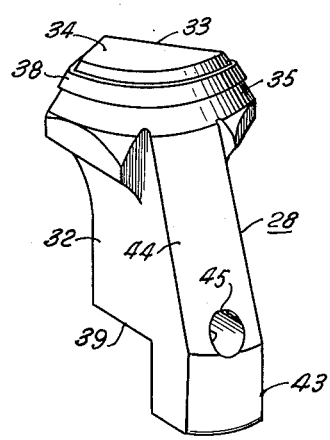
Fig. 6
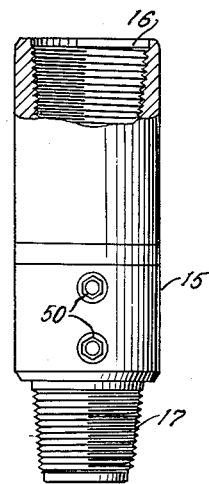
Fig. 8
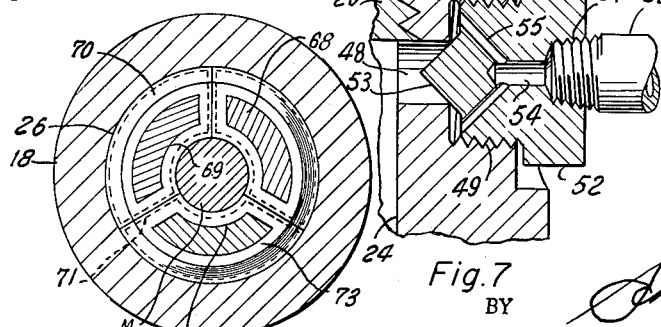
Fig. 7
Fig. 9
INVENTOR
Ira A. Miller
BY Ashley & Ashley
ATTORNEYS United States Patent Office 3,084,898
Patented Apr. 9, 1963

3,084,898
FLUID ACTUATED VALVE
Ira A. Miller, Spencer, Okla., assignor of one-half to Charles W. McCallum, Dallas, Tex.
Continuation of application Ser. No. 503,240, Apr. 22, 1955. This application Feb. 4, 1960, Ser. No. 7,058
10 Claims. (Cl. 251—1)

This invention relates to new and useful improvements in valves.

One object of the invention is to provide an improved valve for well pipe and other fluid conductors subjected to high pressure fluids which may be constructed so as to completely close the bore of the conductor or close off around a member extending longitudinally through said conductor.

A particular object of the invention is to provide an improved valve, of the character described, having coacting valve elements or segments arranged to sealingly engage one another and a seat for completely closing the bore of the fluid conductor and of such construction that a wire line or other member of small diameter may extend between the abutting surfaces of the engaged and seated valve elements without breaking the seal therebetween.

An important object of the invention is to provide an improved valve, of the character described, which is of rugged, simplified construction, which has minimum parts and which is operable by pressure fluid whereby its operation is quick and efficient and is not subject to the failure of springs, links and other mechanical parts.

An object of the invention is to provide an improved valve, of the character described, having piston means or other pressure-responsive means for actuating the valve elements and operable by pressure fluid from an external source as well as by pressure fluid in the conductor, the latter fluid serving to equalize the pressures on opposite sides of the means and making available a source of pressure differential for operating said means.

Another object of the invention is to provide an improved valve, of the character described, wherein the valve elements have pivotal connection with the pressure-responsive means for movement into and out of engaged and seated position, the pivotal connection including coacting means carried by said valve elements and pressure-responsive means and arranged to coact with abutment means for retracting said elements to disengaged or unseated position by imparting rocking action thereto upon disengagement of said elements from the seat.

A further object of the invention is to provide an improved valve, of the character described, which may be employed as a blowout preventer and which may have the inner surfaces of its segments recessed for coacting engagement around a pipe, rod or other cylindrical member extending longitudinally through the valve.

A construction designed to illustrate the invention will be hereinafter described, together with other features of the invention.

Figure 2:
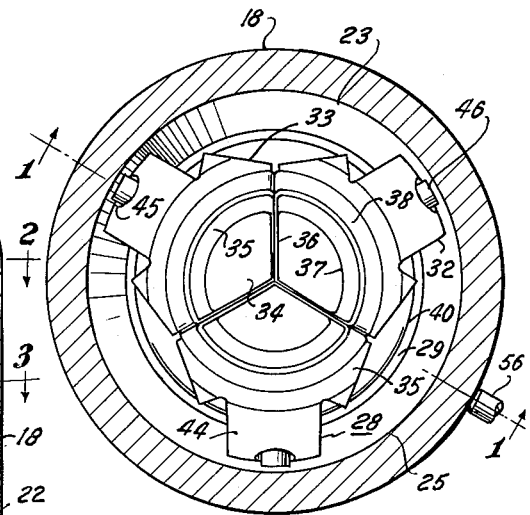
Figure 3:
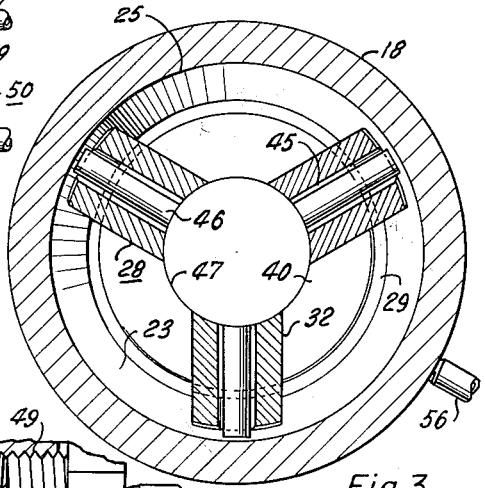
Figure 4:
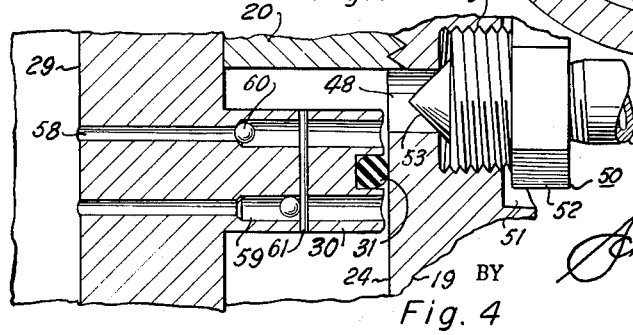

The invention will be more readily understood from a reading of the following specification and by reference to the accompanying drawings, wherein examples of the invention are shown, and wherein:

FIG. 1 is a longitudinal, sectional view of a valve constructed in accordance with the invention and shown in its closed position, FIG. 2 is a cross-sectional view, taken on the line 2—2 of FIG. 1, showing the valve segments in elevation, FIG. 3 is a cross-sectional view, taken on the line 3—3 of FIG. 1, FIG. 4 is an enlarged, longitudinal, sectional view showing the pressure equalizing ports in the flange of the piston and one of the cylinder ports and its valve, FIG. 5 is a view, similar to FIG. 1, showing the valve in its open or disengaged position, FIG. 6 is a perspective view of one of the valve segments, FIG. 7 is an enlarged, longitudinal, sectional view of one of the cylinder ports and its valve, FIG. 8 is an elevational view, partly in section, of a modified housing for the valve, and FIG. 9 is a cross-sectional view of the valve having its segments modified for sealing engagement around a cylindrical member.

This application is a continuation of my copending application Serial No. 503,240, filed April 22, 1955, now abandoned.

In the drawings, the numeral 10 designates the body or housing of a valve incorporating the principles of the invention and having a cylindrical bore or passage 11 extending therethrough. An axial, externally screw-threaded, reduced nipple or pin 12 may be formed on the upper end of the housing, the lower end of which may be provided with an axial, internally screwthreaded, reduced box or collar 13. The pin and box communicate with the bore 11 and are adapted to connect the housing in a pipe 14, such as well casing, tubing, drill pipe or other fluid conductor subjected to high pressure fluids. When used in oil field rotary drill pipe, the valve is mounted between the pipe and conventional Kelly joint (not shown) and its housing is tubular as shown by the numeral 15 with a symmetrical box 16 on its upper end and a pin 17 on its lower end (FIG. 8). In other fluid conductors, the housing and its connections may be asymmetrical as shown in FIGS. 1 and 5.

For assembly purposes, the housing may include upper and lower cylindrical halves or sections 18 and 19 which may be connected by screwthreaded engagement with an annular, internal abutment or connecting member 20 having an external, radial flange 21 confined between the adjacent ends of the housing sections. Suitable packing, such as O-rings 22, is carried by the flange for sealing off the adjacent ends of the housing sections. Preferably, the bore of the abutment member 20 is of the same diameter as the bore 11 of the lower housing section 19 and has its upper end portion enlarged and flared outwardly to provide an inclined shoulder or bevelled surface 23. A cylinder or pressure chamber 24 of enlarged diameter is formed below the abutment member by counter-boring the upper portion of the bore 11, the lower end of said member being screwthreaded into the upper end of the cylinder. A counterbore 25, of a diameter substantially equal to the greatest diameter of the bevelled shoulder 23, extends throughout the major portion of the upper housing section 18 and the upper end of the abutment member is screwthreaded into the lower end thereof. The upper end of the housing section 18 is connected to the reduced pin 12 by an inwardly-inclined top portion or frusto-conical shoulder 26 having an annular, bevelled seat 27 at its upper extremity for engagement by a valve element having a plurality of segments 28.

The valve segments are supported by a tubular part, piston or plunger reciprocally mounted in the cylinder formed by the bore 11 and the bore of the abutment member 20 and having an external, radial flange or pressure-responsive member 30 slidably confined in the cylinder 24. Suitable packing, such as O-rings 31, is carried by the piston and its flange for sealing engagement with the walls of the bores and cylinder 24 whereby said piston and flange are sealably slidable therein. Each valve segment 28 is angular and includes an upright body or shank 32 and an enlarged, inwardly-extending, transverse upper or outer end portion or head 33 which has a sector-shaped upper surface 34 and an arcuate outer margin or peripheral surface 35 (FIG. 6) complementary to the seat 27. The shanks 32 are reduced with respect to the enlarged heads and are spaced from one another.

Substantially upright, flat sides or surfaces 36 extend radially inward from the margin 35 of the head 33 of each segment for mating relation with the adjacent sides of the other segment heads, whereby the margins coact to form an annular, bevelled surface for coaction with the seat and whereby said heads coact to close the upper end of the counterbore 25 (FIGS. 1 and 2). Although the segments may vary in number, three are shown and preferred because such quantity reduces the size of each segment and provides minimum surfaces which require sealing. The margin and sides of each segment head are cut by a continuous groove 37 for receiving a packing member or ring 38 of suitable material. In addition to sealing off between the seat 27 and the margins 35 of the segment heads 33, the packing rings engage one another and seal off between the adjacent sides 36 of said heads when the segments are in their seated position.

For supporting the valve segments 28 in their upright, seated or engaged position, the inner lower portion of each segment shank 32 is recessed to provide a shoulder 39 for resting upon an annular flange 40 at the upper end of the piston 29. The flange 40 is formed by an external circumferential groove or recess 41 below the upper end of the piston and is of slightly reduced diameter. As shown by the numeral 42, the lower peripheral edge portion of the flange is bevelled or relieved for coacting with an external arm or lug 43 which depends from the outer lower end of the segment shank below its shoulder 39. It is noted that the inner surface of the lug 43 is concaved transversely complementary to the curvature of the flange and that the shank has an outer surface 44 inclined inwardly from said lug to the bevelled outer margin 35 of the head 33 whereby said margin is disposed inwardly of said lug. For movement into and out of operative position, each segment is pivotally connected to the piston and has a radial or transverse opening 45 in the lower extremity of its shank for receiving one of a plurality of equally-spaced lugs or pins 46 welded or otherwise secured to the upper surface of the flange 40 and projecting radially therefrom into the counterbore 25 (FIG. 3). Each opening is elongated or slotted longitudinally of the shank to permit pivotal movement of the segment radially of the piston (FIG. 5) and has its lower portion cut away by the shoulder 39 whereby only the outer end or lug portion of the opening has an encircling wall.

It is noted that the openings 45 and pins 46 coact to retain the valve segments 28 against displacement and that said segments are moved into and out of operative position by coaction with the housing 10 and piston 29. As shown in FIG. 5, the segments are pivoted inwardly upon upward reciprocation of the piston and engagement of the segment heads 33 with the inclined shoulder 26 of the upper housing section 18 which provides an abutment for said segments. Continued upward reciprocation moves the segments into sealing engagement with the annular seat 27 and with each other (FIGS. 1 and 2). Upon downward reciprocation, the depending lugs 43 of the segments strike the inclined surface 23 of the abutment member 20 and said lugs rock on the bevelled edge portion 42 of the flange 40 whereby said segments are pivoted outwardly (FIG. 5). The annular recess 41 accommodates the lower ends of the lugs as well as any necessary displacement of fluid or solids therein during the opening or closing operation. Due to their inclined outer surfaces 44 and the inward position of the heads and their arcuate margins 35, the segments are retracted outwardly of the bore diameter of the housing pin 12 to provide ample clearance for the passage of tools and other members. As shown by the numeral 47, the bore of the tubular piston has its upper portion reduced in accordance with the reduced external diameter of the upper end of said piston but said bore is as large as or larger than the bore diameter of the housing pin.

For reciprocating the piston 29 to actuate the valve segments, a pair of radial openings or ports 48 extend through the wall of the lower housing section 19 in communication with the upper and lower ends of the cylinder or chamber 24. Each port has an axially-alined, screwthreaded counterbore 49 at its outer end for receiving a plug valve 50 and an enlarged recess 51 surrounds the outer end of the counterbore to accommodate the polygonal head 52 of the valve (FIG. 7). A reduced, conical valve element or pin 53 projects axially from the inner end of the plug valve for engagement with the outer end of the port 48 to control flow therethrough. The valve 50 has an axial bore 54 in its outer portion and a plurality of ducts 55 extend from the inner end of the bore to the inner end of said valve for establishing communication with the counterbore 49, whereby said bore communicates with the port when the valve element 53 is retracted from engagement with said port. It is noted that the combined flow capacities of the ducts are equal to or exceed the flow capacity of the bore of the valve. A pipe or other fluid conductor 56 is screwthreaded in the outer end of the bore 54, which may be enlarged as shown by the numeral 57, for admitting and discharging fluid under pressure to and from the cylinder for acting upon the piston flange or pressure-responsive member 30. It is noted that the pipe 56 may be in the nature of a fitting which is connected to the plug valve only when it is desired to supply pressure fluid to the cylinder. When one of the plug valves is retracted to admit pressure fluid to one end of the cylinder, the other valve is opened to discharge or vent fluid from the other end of said cylinder and create a pressure differential for reciprocating the piston. Preferably, the cylinder is filled with grease or other lubricant which may be utilized as the pressure fluid.

It is desirable to permit reciprocation of the piston 29 by the pressure of the fluid in the pipe 14. As shown in FIG. 4, a pair of radial apertures or small openings 58 are provided in the wall of the piston in communication with axially-alined counterbores 59 extending through the flange or member 30 above and below its O-ring 31. A ball valve 60 is confined within each counterbore 59 by suitable means, such as a pin 61 extending transversely through the flange and counterbore, and is adapted to seat against the outer end of the aperture 58. Since the counterbores are of greater diameter than the apertures, the pressure in the cylinder or chamber 24 holds the ball valves 60 seated until excessive pressure is present in the pipe 14 and the bore of the piston. This excessive pressure occurs in oil and gas wells upon the uncontrolled flow of the well fluids or a blowout due to the failure of control means or drilling into a stratum of high pressure gas. By opening the upper plug valve 50, the pressure in the cylinder above the piston flange is vented or relieved sufficiently to permit upward movement of the piston by the pressure of the fluid below said flange. Although both ball valves are unseated to admit pressure fluid from the piston bore to the cylinder above and below the flange, the venting of fluid through the opened plug valve exceeds the inflow through the upper aperture and counterbore due to the greater diameter or flow capacity of the bore 54 and ducts 55 of said plug valve. As a result, the pressure of the fluid below the flange increases relative to the fluid above said flange and forces the piston upwardly to move the valve segments 28 into sealing engagement with the annular seat 27. Upon closing the upper plug valve and opening the lower plug valve, the pressure fluid in the pipe 14 may be utilized to force the piston downwardly.

Manifestly, the seated valve segments are urged into more positive sealing engagement with the seat 27 by the pressure of the fluid in the pipe 14 therebelow. In order to unseat the segments, it is preferable to equalize the pressures above and below said segments. For conducting the pressure fluid from below to above the segment heads 33, an opening or port 62 extends through the inclined shoulder 26 of the upper housing section 18 in communication with its counterbore 25. A suitable external block 63 overlies the port 62 and has an axially-alined, screwthreaded opening 64 communicating therewith for receiving a valve element or screw 65 which is adapted to engage in the outer end of said port. The block extends radially of the shoulder to the base of the housing pin 12 and is welded or otherwise secured. A passage 66 extends longitudinally of the block 63 from its opening 64 to a radial opening or port 67 in the base of the housing pin, whereby the bore of said pin communicates with the counterbore to bypass and equalize the pressures above and below the valve segments when the valve element 65 is retracted from engagement with the outer end of the port 62 (FIG. 5).

Due to the provision of the packing rings 38 on the heads 33 of the valve segments, a wire line L or other member of small diameter may extend between said segments when their heads are engaged without breaking the seal between said rings. As shown in FIG. 1, the position of the line L is immaterial and may be between the sides 36 of the segment heads since the packing rings project sufficiently to deform around said line. Although the invention has been described as a safety valve, it is pointed out that the same may function as a blowout preventer for closing off around a cylindrical member M, such as a pipe, rod or tubing. As shown by the numeral 68 in FIG. 9, the heads of the valve segments are modified and have arcuate or recessed inner peripheral or marginal surfaces 69 which are upright and concentric to bevelled outer margins or peripheral surfaces 70, similar to the bevelled margins 35. Ends or sides 71, of less length than the sides 36, are provided on the modified segment heads and continuous grooves 72 encircle the sides and outer margins 70 of said heads for receiving complementary packing rings 73. The inner, upright surfaces 69 move into sealing engagement with the member M when the surfaces 70 move into sealing engagement with the housing seat, the seal being formed by the packing rings 73 engaging one another and said member and seat.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A valve including a housing having a bore extending therethrough, a tubular piston reciprocal in and communicating with the bore, a cylinder in said bore and surrounding a portion of the piston, means for admitting and discharging pressure fluid to and from the cylinder for actuating said piston, an annular bevelled valve seat in said bore and spaced from the downstream end of said piston, a plurality of valve segments reciprocal with said piston and extending between the valve seat and said piston end, the segments having complementary outer end portions for engagement with said seat and one another, said segments being pivotally connected to said piston end for lateral pivotal movement to engage and disengage their outer end portions and having their inner end portions extending upstream past their pivotal connections, an inclined abutment surface in said bore adjacent said seat and engageable by the outer end portions of said segments to pivot said outer end portions inwardly into engagement with said seat and one another upon downstream reciprocation of said piston toward said seat, and an annular abutment member in said bore adjacent the donwstream end of said piston and having an internal inclined surface engageable by the exteriors of the inner end portions of said segments to pivot said outer end portions outwardly and provide an unobstructed passage through said housing bore when said piston is reciprocated upstream away from said seat.

2. A valve as set forth in claim 1 wherein the valve seat is disposed above the piston and the valve segments rest upon and have their lower portions in constant engagement with said piston.

3. A valve as set forth in claim 1 wherein the valve segments include a trio of elements having enlarged inwardly-extending rigid heads at their outer end portions, each head having an arcuate outer margin for engagement with the valve seat and an angular inner margin for engagement with the complementary margins of the other heads, and an external packing ring encircling the inner and outer margins of each head for sealing engagement with said seat and with the packing rings of the other heads.

4. A valve including a housing having a bore extending therethrough, tubular piston means reciprocal in and communicating with the bore, a cylinder in said bore surrounding a portion of the piston means, means for admitting and discharging pressure fluid to and from the cylinder for actuating said piston means and including ports in said piston means communicating with said cylinder for admitting pressure fluid thereto from said bore, a valve seat in said bore, valve segments pivotally connected at their inner ends to one end of said piston means so as to extend axially outward from said end for pivotal movement to engage and disengage their outer ends, the segments being reciprocal with said piston means to engage and disengage their outer ends with and from the seat, said segments being pivotal to an unseated position laterally of the piston means to provide an unobstructed axial passage through the housing, an abutment member adjacent said cylinder and engageable by the inner ends for pivoting said segments to retract their outer ends, and abutment means adjacent said seat and engageable by said outer ends for pivoting said segments to engage their outer ends with one another.

5. A valve including a housing having a bore extending therethrough, a tubular piston reciprocal in and communicating with the bore, a cylinder in said bore and surrounding a portion of the piston, means for admitting and discharging pressure fluid to and from the cylinder for actuating said piston, an annular bevelled valve seat in said bore and spaced from the downstream end of said piston, a plurality of valve segments reciprocal with said piston and extending between the valve seat and said piston end, the segments having complementary outer end portions for engagement with said seat and one another, said segments being pivotally connected to said piston end for lateral pivotal movement to engage and disengage their outer end portions and having their inner end portions extending upstream past their pivotal connections, and abutment means in said bore adjacent the downstream end of said piston and having an internal inclined surface engageable by the exteriors of the inner end portions of said segments to pivot said outer end portions outwardly and provide an unobstructed passage through said housing bore when said piston is reciprocated upstream away from said seat.

6. A valve as set forth in claim 5 wherein the valve seat is disposed above the piston and the valve segments rest upon and have their lower portions in constant engagement with said piston.

7. A valve as set forth in claim 5 wherein the valve segments include a trio of elements having enlarged inwardly-extending rigid heads at their outer end portions, each head having an arcuate outer margin for engagement with the valve seat and an angular inner margin for engagement with the complementary margins of the other heads, and an external packing ring encircling the inner and outer margins of each head for sealing engagement with said seat and with the packing rings of the other heads.

8. A valve including a body having a passage therethrough, an annular bevelled valve seat in the body surrounding the passage, a valve element including segments movable together and against the valve seat and also movable apart to an unseated position in which the segments lie laterally of said passage to provide an unobstructed axial flow path through said body corresponding to the minimum diameter of its passage, a tubular part movable axially of said passage with the valve element and having its interior in communication with said passage and its downstream end spaced from said valve seat, means for sealing off between said body and tubular part, a pressure-responsive member on said tubular part and sealably slidable within said body to define with said body a pressure chamber, the pressure-responsive member being arranged to move in an upstream direction to unseat said valve element and in a downstream direction to seat said element, means for admitting and discharging fluid to and from the pressure chamber for actuating said pressure-responsive member, the valve segments extending between said valve seat and tubular part and having complementary outer end portions for engagement with said seat and one another, said segments being pivotally connected to said tubular part and having their inner end portions extending upstream past their pivotal connections, and means in said passage adjacent the downstream end of said tubular part and having an annular internal inclined surface engageable by the exteriors of the inner end portions of said segments to pivot said outer end portions outwardly and provide an unobstructed passageway through said housing when said tubular part is reciprocated upstream away from said seat.

9. A valve as set forth in claim 8 wherein the valve seat is disposed above the tubular part and the valve segments rest upon and have their lower portions in constant engagement with said tubular part.

10. A valve as set forth in claim 8 wherein the valve segments include a trio of elements having enlarged inwardly-extending rigid heads at their outer end portions, each head having an arcuate outer margin for engagement with the valve seat and an angular inner margin for engagement with the complementary margins of the other heads, and an external packing ring encircling the inner and outer margins of each head for sealing engagement with said seat and with the packing rings of the other heads.

References Cited in the file of this patent

UNITED STATES PATENTS

| | | |
|---|---|---|
| 149,430 | Bowen | Apr. 7, 1874 |
| 1,697,608 | Patterson | Jan. 1, 1929 |
| 1,791,613 | Clay | Feb. 10, 1931 |
| 1,839,393 | Inge | Jan. 5, 1932 |
| 1,869,345 | Vallendor | July 26, 1932 |
| 2,159,540 | MacClatchie | May 23, 1939 |
| 2,313,177 | Sprague | Mar. 9, 1943 |
| 2,502,803 | Sorensen | Apr. 4, 1950 |
| 2,760,750 | Schweitzer | Aug. 28, 1956 |
| 2,798,561 | True | July 9, 1957 |